United States Patent [19]

Wiseman

[11] Patent Number: 4,711,272
[45] Date of Patent: Dec. 8, 1987

[54] SURGE IRRIGATION VALVE

[75] Inventor: Michael D. Wiseman, Houston, Tex.

[73] Assignee: Hydro-Pulse, Inc., Houston, Tex.

[21] Appl. No.: 2,750

[22] Filed: Jan. 12, 1987

[51] Int. Cl.[4] .......................................... F16K 11/07
[52] U.S. Cl. ................................... 137/887; 137/242;
137/315; 137/625.47; 137/876
[58] Field of Search ............... 137/862, 870, 875, 876, 137/887, 625.47, 315, 242

[56] References Cited

U.S. PATENT DOCUMENTS

| Re. 30,224 | 3/1980 | Ortega . | |
|---|---|---|---|
| 1,603,837 | 10/1926 | Carson . | |
| 1,999,804 | 4/1935 | DeLoria . | |
| 2,077,779 | 4/1937 | Jones | 137/875 X |
| 2,081,510 | 5/1937 | Smart . | |
| 2,442,498 | 6/1948 | Kooken . | |
| 2,506,097 | 5/1950 | Melichar . | |
| 2,979,082 | 4/1961 | Neves . | |
| 3,011,509 | 12/1961 | Wilson . | |
| 3,108,609 | 10/1963 | Schroder . | |
| 3,405,733 | 10/1968 | Hansen . | |
| 3,512,543 | 5/1970 | Kubik . | |
| 3,618,637 | 11/1971 | Santomieri . | |
| 3,779,269 | 12/1973 | Gould . | |
| 4,398,562 | 8/1983 | Saarem et al. . | |
| 4,429,717 | 2/1984 | Montgomery | 137/242 X |
| 4,458,708 | 7/1984 | Leonard et al. . | |

FOREIGN PATENT DOCUMENTS 1182381  2/1970  United Kingdom ................. 137/875

Primary Examiner—A. Michael Chambers
Attorney, Agent, or Firm—Vaden, Eickenroht, Thompson & Boulware

[57] ABSTRACT

A valve for use in distributing irrigation water in a surge irrigation system. The valve having a diverter member rotatably mounted within the cylindrical cavity of a valve body. The diverter member has an arcuate diverter plate mounted thereon which conforms to the curvature of the cylindrical cavity and wiper blades extending from said diverter plate into the space between said plate and the interior of the valve body. Upon circulatory or oscillatory rotation of the diverter member, the wiper blades sweep the interior of the valve body. The diverter plate may be selectively aligned with one of the outlet ports in the valve body, thereby diverting flow from the inlet port to the remaining outlet ports. The diverter member design minimizes engagement with particulate matter and it minimizes the force exerted upon this member by the irrigation water to decrease the torque and corresponding power consumption required to rotate the diverter member.

17 Claims, 11 Drawing Figures

SURGE IRRIGATION VALVE

BACKGROUND OF THE INVENTION

This invention relates to an irrigation water distributing device for directing irrigation water to a plurality of field furrows and, more particularly, relates to a surge irrigation valve.

In the irrigation of crops which are planted in rows, it is common to introduce water at the high end of a field in order that the water may flow by gravity down the furrows to the opposite end of the field. One such method of irrigation is continuous irrigation wherein water is continuously introduced at the high end of the field until the water has reached and has had sufficient time to soak the low end of the field.

However, in many situations, continuous irrigation unevenly distributes irrigation water in the soil which adversely affects plant growth and yields. In particular, water tends to soak in too deeply at the high and low ends of the field and not wetting deep enough in the middle of the field. In order to remedy this situation, continuous irrigation is prolonged which results in a considerable amount of water being wasted in run-off at the low end of the field.

Surge irrigation is an improved method of furrow irrigation that creates a wetting time and a "resting" or recession time on each furrow by cycling water on and off to same in a series of timed increments. During the recession time between alternate wettings, the watered portion of the furrow develops a thin seal on the soil surface reducing the soil's permeability. The formation of the thin seal on the higher end of the field speeds the advance of the water further down the furrow during subsequent wettings. Surge irrigation minimizes unnecessary over-soaking of the high and low ends of the field and minimizes water run-off in attempting to properly soak the middle of the field.

Several theories have been advanced as to how the soil seal in surge irrigation is formed. Continuing research in this field suggests that as the water soaks in, the soil's clods dissolve and settle with the water to form a slick, sealed surface which encrusts by drying during the recession period. In lighter soils, the clay particles in the soil continue to progressively swell even as the flow recedes so that the next surge flow simply finds less infiltration opportunity. A third possible explanation is that as each surge flow recedes, the capillary attraction of the soil and water traps air bubbles that block the small pores of the surface soil and slow down the infiltration of the next surge flow. Whatever the mechanism, the fact remains that the furrow stream advances more quickly over the already wetted soil and slows as it reaches the greater intake demands of drier soil.

In the practice of surge irrigation, farmers are faced with several important considerations when selecting a surge irrigation valve. These are: (1) elimination of water hammer effect, (2) valve pressure drop, (3) minimize electrical and torque requirements of the motorized surge valve, (4) minimize effect of particulate matter, typically sand, entrained in the irrigation supply water, and (5) minimize the number of moving parts.

The water hammer effect is the dynamic increase or decrease of water pressure within the water supply pipes occuring when flow is either terminated or initiated abruptly, respectively. The water hammer effect, if present, has a deleterious effect on the water supply pipes which are typically of concrete or a hard plastic, such as polyvinylchloride (PVC). The rotor valves of U.S. Pat. Nos. 2,506,097; 3,618,637; 3,779,269; and 4,398,562 are deficient in this regard. In particular, each of these rotor valves has a rotor which is mounted for rotation within the valve body and is provided with a substantially L-shaped flow passage formed therethrough. The inlet portion of the rotor is in coaxial alignment with the input or supply port. The outlet portion of the flow passage is positionable, as the rotor revolves, and may be positioned into coaxial alignment with each of the valve outlet ports. However, in transit between valve outlet ports, flow is abruptly terminated; and once in alignment, flow initiates abruptly, thereby creating water hammer effects.

The pressure drop across the valve directly affects system flow throughput, area of irrigation, pump size, and energy requirements. The disc valves of U.S. Pat. Nos. 1,999,804; 2,081,510; 3,108,609; and 4,458,708 with their flow restrictions and multiple flow direction changes would not be acceptable for field irrigation purposes where delivery pressures range from about 4 to about 8 psig. Similarly, butterfly valves are typically designed with flow restrictions, particularly where the butterfly valve seats, thereby reducing the flow rate through such conventional valves.

The third consideration (minimal torque) is related to the pressure force exerted by the irrigation supply water on the internal moving valve member. In most conventional irrigation valves, an electric motor controlled by an automatic sequencer operates the internal valve member to effect the desired cycling of irrigation water. The torque the electric motor is required to supply to operate the valve is in part proportional to the force exerted upon the surface area of the internal valve member normal to the incoming supply water. It should be noted that these valves and distribution pipes are usually located beyond the reach of electric utility lines and must be frequently moved from place to place in the field. Therefore, the valve motors must be powered by a portable source, typically an automotive storage battery. Thus, when the power consumption of the motor is large, the battery must be recharged frequently.

The cylindrical valve member of U.S. Pat. No. Re. 30,224 is unsuitable in this regard. In design, the valve of U.S. Pat. No. Re. 30,224 is hollow with an open bottom coaxial with the water supply and a closed top. Thus, the force exerted is equal to the area of the closed top which forces it upward against the valve housing. Furthermore, since the cylindrical valve member rides on its seals, the radial force of the supply water on the cylindrical wall of the valve member tends to cock or slightly misalign the axis of the valve member with respect to that of the valve housing. Thus, the closed top, the friction of the seals, and cocking of the valve member combine to increase the torque required to rotate the valve member. Butterfly valves also have a large surface area normal to the direction of flow, thereby increasing the torque required to rotate same.

Typically, irrigation water has entrained therein particulate matter such as slit and sand. The particulate matter tends to collect in the bottom of the valve and obstruct or impair the movement of the valve member, thereby increasing motor torque requirements. Although most of the particulate matter tends to fall from the water into the bottom of the interior of the valve body with some hard irrigation waters, all of the surfaces of the interior of the valve become encrusted with mineral deposits with possible embedded fine particulate matter. The accumulation of solid particles and mineral deposits may eventually render the valve inoperable. With irrigation water containing sand or the like, the disc valves mentioned herein would tend to fill up with particulate matter due to the multiple changes in flow direction. The valve of U.S. Pat. No. Re. 30,224, wherein the valve member rides on its seals, would quickly be rendered inoperable due to sand obstructing the valve member's movement. Similarly, butterfly valves would tend to collect sand on the bottom of the valve housing, thereby impeding the movement of the valve member and proper functioning thereof.

Finally, to minimize maintenance efforts, the number and complexity of moving parts should be held to a minimum. For this reason, the disc valves mentioned herein and the irrigation hydrant (butterfly valves) of U.S. Pat. No. 3,011,509 are undesirable.

These, and other limitations and disadvantages of the prior art and especially of the aforementioned patents, are overcome with the present invention and commercially acceptable and competitive embodiments of a surge irrigation valve and the like are herein provided.

SUMMARY OF THE INVENTION

Accordingly, a feature of the present invention is a surge irrigation valve which is lightweight, durable and portable.

Another feature is a surge irrigation valve which does not produce water hammer effects.

A further feature is a surge irrigation valve of a design that does not restrict flow and that minimizes pressure losses.

Yet another feature is a surge irrigation valve with significantly reduced power consumption and torque requirements and which allows the use of a relatively lightweight battery with improved useful life between rechargings.

A further feature is a surge irrigation valve of a design that minimizes the effects of entrained and settled solid particles.

Yet another feature is a surge irrigation valve with a minimum of moving parts.

Another feature is a surge irrigation valve in which the cycling of flow through the various outlet ports thereof is by a programmable computing device which may be programmed to vary the flow sequences as a function of time.

The foregoing features and other features of the invention are realized in an illustrative embodiment of a surge irrigation valve. The valve comprises a valve body and a diverter member. The valve body has a cylindrical cavity, an inlet port and a plurality of outlet ports. The diverter member is rotatably mounted within the cylindrical cavity. The inlet port, cylindrical cavity and the diverter member are substantially in coaxial alignment with each other.

The diverter member comprises a pair of circular support rings, an axially aligned central shaft and an arcuate diverter plate. Each of the support rings has a central hub, an outer ring, and a first and second spoke radiating from the central hub to the outer ring. The central shaft extends through the diverter member centrally and supports the support rings.

The arcuate diverter plate conforms to the curvature of the cylindrical cavity and is mounted to the periphery of the support rings on the outer rings. The diverter plate is mounted in a spatial relationship with respect to the interior cylindrical surface of the valve body. Upon rotation (including oscillation) of the diverter member, the diverter plate may be selectively aligned with one of the outlet ports. Once so aligned, the diverter plate covers and restricts the flow of irrigation water through the aligned outlet port. Thus, the diverter plate diverts the flow to the remaining outlet ports.

The valve body preferably includes an opening in alignment with the diverter member and a removable cover. This opening is positioned generally opposite the inlet port. The cover is positioned over this opening and is removably attached to the valve body. When the cover is detached therefrom, the diverter member may be withdrawn from the valve body. The cover preferably has a small valve which permits watering of the furrow in which the surge valve rests. Furthermore, this small valve is preferably positioned to flush out any particulate matter which may have settled out of the irrigation water in the cylindrical cavity.

Proper alignment of the diverter member is effected by locking and unlocking same into predetermined positions with respect to the outlet ports. The timing of the locking and unlocking of the diverter member and the rotation of same is preferably programmably controlled. Further flexibility is possible by locking the diverter member into such a position that none of the outlet ports are blocked so as to allow continuous irrigation.

Though the diverter member may be rotated in a circular or oscillatory manner, the diverter member is preferably oscillated in the upper portion of the valve body. In this manner, the diverter members avoids any particulate matter, for example, sand, that may have settled in the cylindrical body.

Along the same lines, a flexible wiper is preferably mounted to the diverter plate for wiping the cylindrically arcuate interior surface of the valve body. Thus, as the diverter member is rotated in a circular or oscillatory manner, the wiper wipes this interior surfact and minimizes or eliminates the deposition or encrustation of mineral deposits onto portions of the valve body in the path of movement of the diverter plate. The flexible wiper also serves to restrict the flow of irrigation water through the outlet port with which the diverter plate is aligned. Preferably, four elastomeric wiper blades are utilized with each one being mounted adjacent to one of the edges of the diverter plate and with each one perpendicularly intersecting two others. Any particulate matter caught between the wiper blades is washed off by the restricted flow of irrigation water around the diverter plate into the aligned outlet port.

Accordingly, these and other features and advantages of the present invention will become apparent from the following detailed description, wherein reference is made to the figures in the accompanying drawings.

IN THE DRAWINGS

DESCRIPTION

Figure 1:
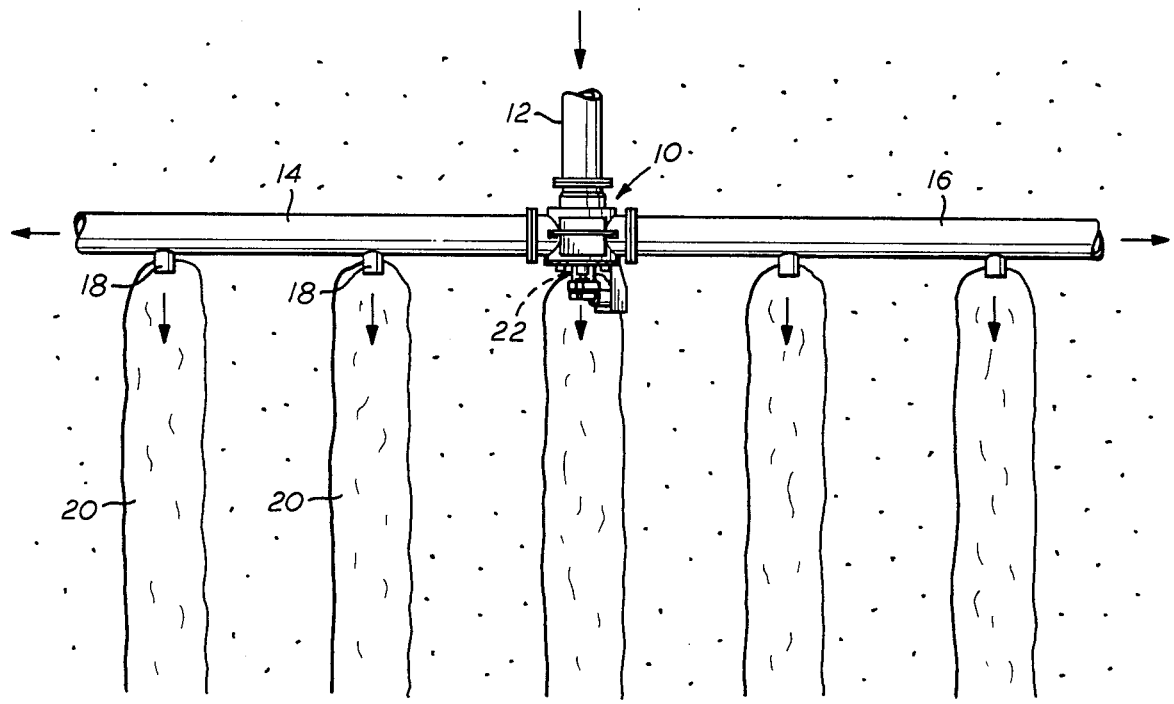
FIG. 1 is a top elevation of a surge irrigation valve embodying the concepts of the present invention in an installed position.

Referring now to the drawings in which like numerals denote similar elements, and more particularly to FIG. 1, there is shown by way of illustration, but not of limitation, a surge irrigation valve 10 in an installed position with an inlet pipe 12 and a first and a second distribution header 14 and 16, respectively. Each distribution header is equipped with discharge nozzles 18 (typical) through which irrigation water is discharged into its respective furrow 20. The surge irrigation valve 10 is also equipped with a blow valve 22 which when actuated may be used to water the furrow 20 within which the surge irrigation valve 10 is positioned and/or for blowing out any particulate matter entrained in the irrigation water that may have settled out within the valve 10.

Figure 2:
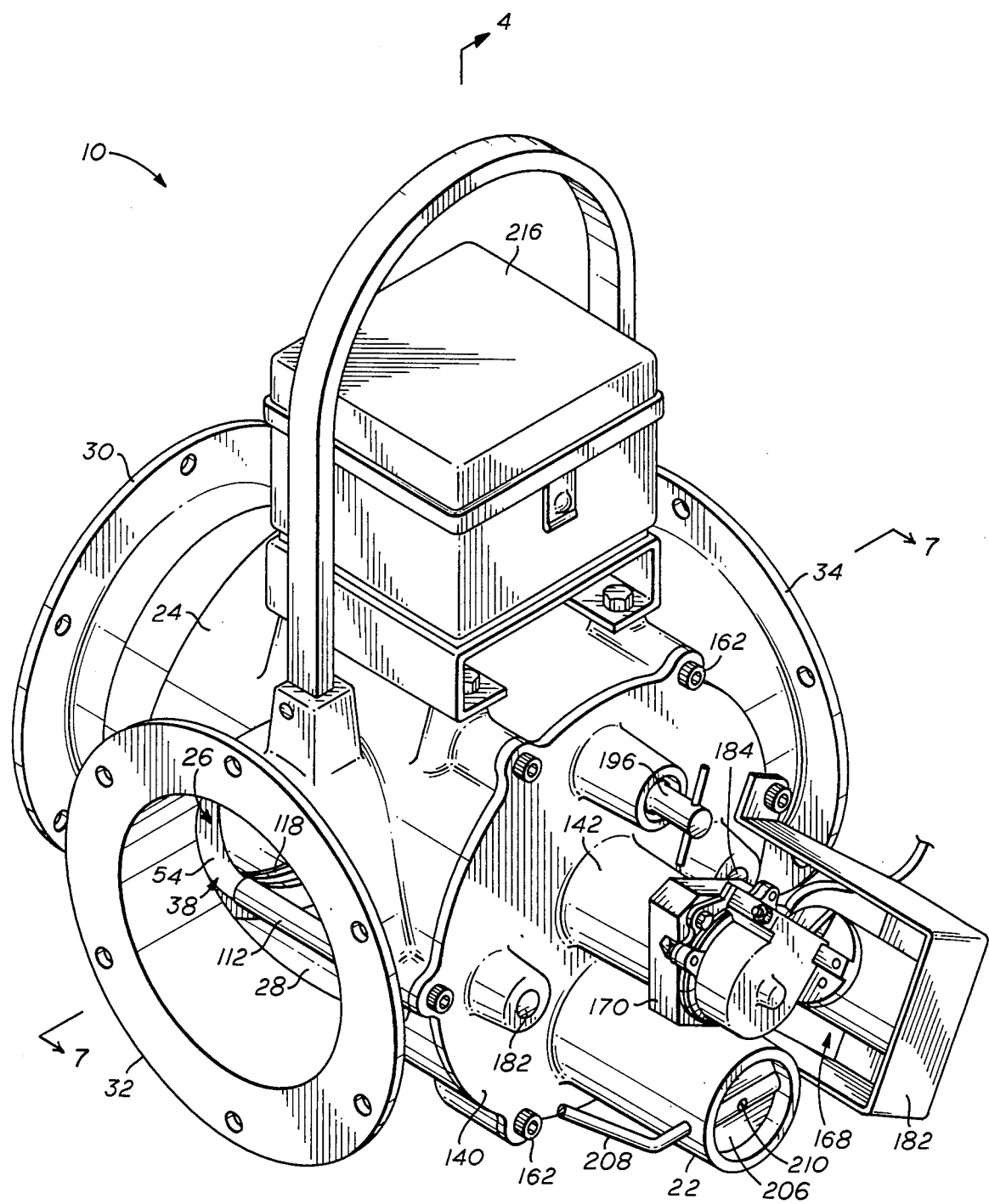
FIG. 2 is a perspective pictorial representation of the surge irrigation valve shown in FIG. 1.
Figure 3:
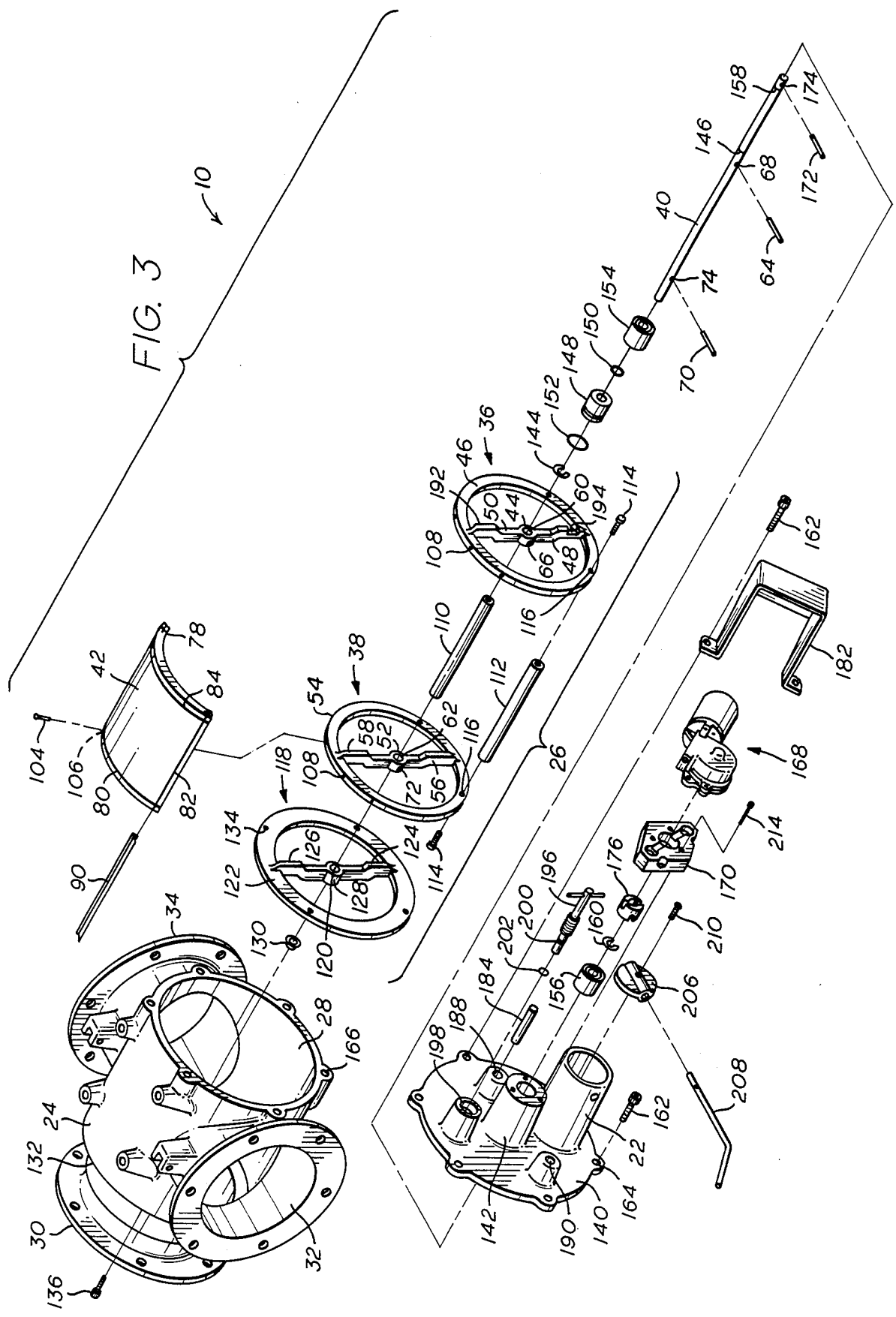
FIG. 3 is an exploded view of the surge irrigation valve shown in FIG. 2 without the programmable controller.
Figure 4:
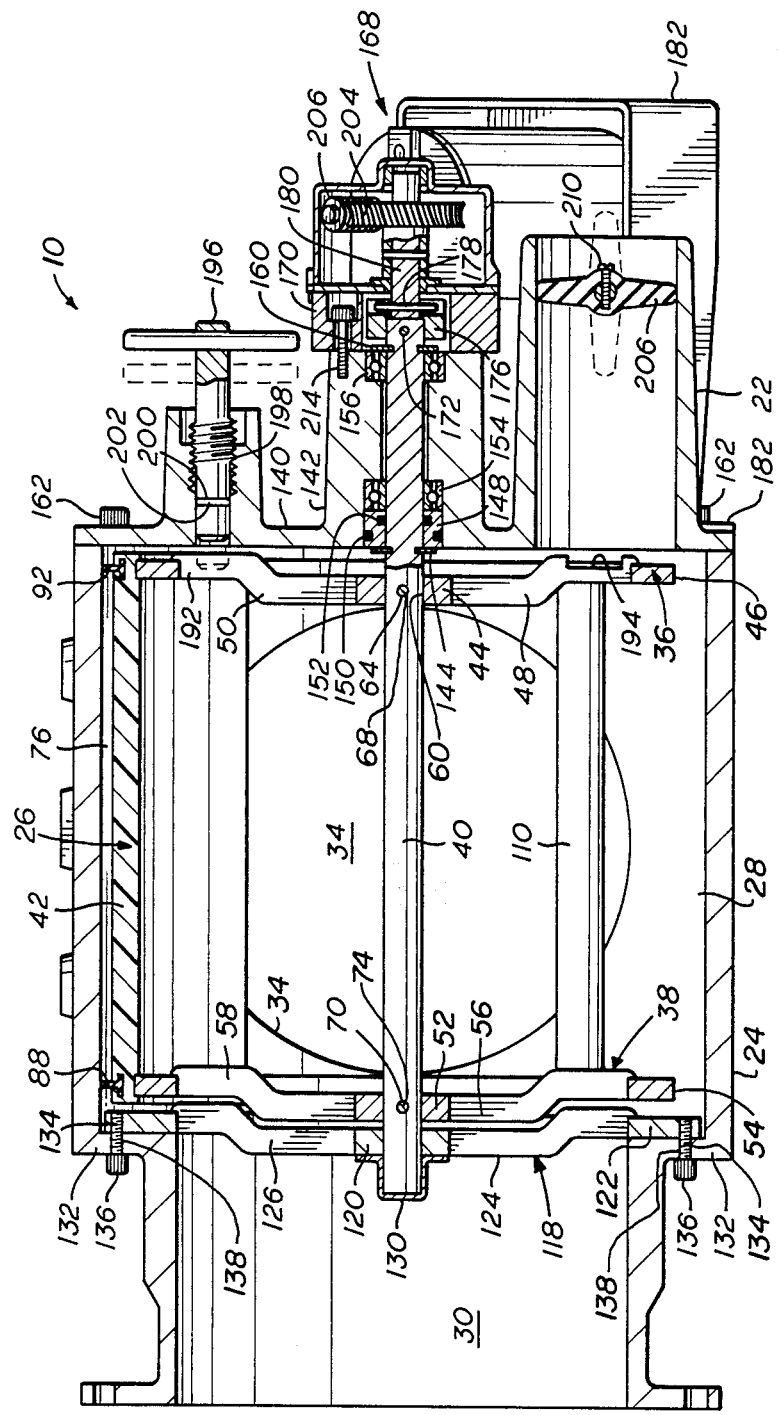
FIG. 4 is an enlarged cross-sectional view taken essentially on line 4—4 of FIG. 2.

Referring now to FIGS. 2 through 4, the valve 10 comprises a valve body 24 and a diverter member 26. The valve body 24 has a cylindrical cavity 28, an inlet port 30, a first outlet port 32 and a second outlet port 34. The cylindrical cavity 28 and the inlet port 30 are substantially coaxial. Likewise, the outlet ports 32 and 34 are substantially coaxial and perpendicular to the axis of the inlet port 30.

The diverter member 26 is comprised of a first and a second circular support ring 36 and 38, respectfully, an axially aligned central shaft 40, and an arcuate diverter plate 42. The first support ring 36 has a central hub 44, an outer ring 46, and a pair of spokes 48 and 50, each radiating opposite each other from the central hub 44 to the outer ring 46. Similarly, the second support ring 38 has a central hub 56, an outer ring 54, and a pair of spokes 56 and 58, each radiating opposite each other from the central hub 52 to the outer ring 54. The axially aligned central shaft 40 extends centrally through the diverter member 26 and spacially supports the circular support rings 36 and 38. To so support the circular support rings 36 and 38, the shaft 40 extends through an axial hole 60 in the first central hub 44 and an axial hole 62 in the second central hub 52. A first pin 64 is inserted through a radial hole 66 in the first hub 44 and a first shaft hole 68, once the two holes 66 and 68 are aligned. A second pin 70 is inserted through a radial hole 72 in the second hub 52 and a second shaft hole 74, once the two holes 72 and 74 are aligned.

Figure 5:
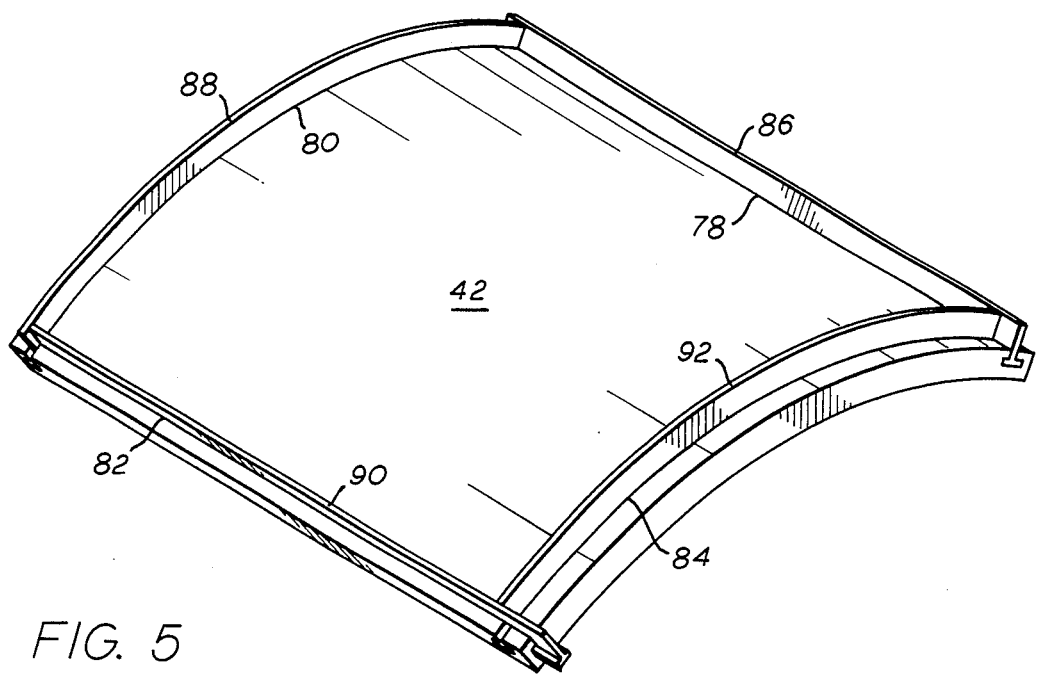
FIG. 5 is an enlarged view of the diverter plate of FIG. 3.
Figure 6:
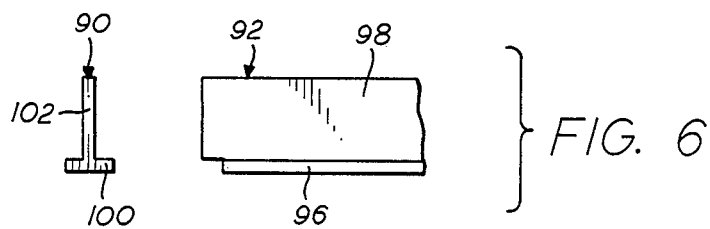
FIG. 6 is a detail of the mating portions of two intersecting wiper blades.

The arcuate diverter plate 42 conforms to the curvature of the cylindrical cavity 28 and is mounted to the periphery of the support rings 36 and 38 on the outer rings 46 and 54 with fasteners 104 (typical) which are inserted through holes 106 (typical) in the diverter plate 42 and radially oriented holes 108 (typical) in the respective outer rings 46 and 54. The diverter plate 42 is mounted in a spatial relationship with respect to the cylindrically arcuate interior surface of the valve body 24 which defines the cylindrical cavity 28 forming a gap 76 therebetween (see FIG. 3). Grooves 78, 80, 82 and 84 in the shape of inverted T's in the exterior surface of the diverter plate 42 extend adjacent to and parallel to the edges of the diverter plate 42. Wiper blades 86, 88, 90 and 92 are slid into their respective groove 78, 80, 82 and 84. The wiper blades 86, 88, 90 and 92 are flexible, and preferably of an elastomeric material, and they have a groove engaging portion and a blade portion which are perpendicular to each other. They have an inverted T-shaped cross section. The wiper blades 86 and 90 run the entire length of their respective groove 78 and 82. The wiper blades 88 and 92 are at least as long as, and preferably a little longer than, the length of grooves 80 a 84 which are between grooves 78 and 82. This clearly shown in FIG. 5 with respect to wiper blades 88 and 90. The ends of wiper blades 88 and 92, which abut wiper blades 86 and 90 when installed, have a portion of their groove engaging portion removed. For example, in FIG. 6, there is shown wiper blade 92 with a portion of its groove engaging portion 96 removed such that when it abuts wiper blade 90, the blade portion 98 of wiper blade 92 is over a part of the groove engaging portion 100 and in contact with the blade portion 102 of wiper blade 90. If wiper blades 88 and 92 are a little longer than the distance between grooves 78 and 82, they are compressed between wiper blades 86 and 90. Once installed, the probability of any of the wiper blades working themselves loose is thereby reduced.

For additional bracing, a pair of bracing rods 110 and 112 is preferably mounted between and onto the outer rings 56 and 54. Fasteners 114 (typical) are inserted through holes 116 (typical) in the outer rings 46 and 54 into engagement with the ends of the bracing rods 110 and 112.

A mounting ring 118 is utilized to stabilize one end of the central shaft 40 and allow rotation of same. The mounting ring 118, like the first and second support rings 36 and 38, has a central hub 120, an outer ring 122, and a pair of spokes 124 and 126, each radiating opposite each other from the central hub 120 to the outer ring 122. The central hub 120 has an axial hole 128 through which the central shaft 40 extends such that the mounting ring 118 is adjacent to the second support ring 38. A button fastener 130 is then fitted on the end of the central shaft 40 to keep particulate matter from entering into the space between the shaft 40 and the central hub 120.

The diverter member 26 is now inserted into the cylindrical cavity 28 mounting ring 118 first. The mounting ring 118 will come to rest on an annular lip 132 about the inlet port 30 entrance to the cylindrical cavity 28. The annular lip 132 is more clearly seen in FIG. 4. The mounting ring 118 has a plurality of mounting holes 134 (typical) extending perpendicularly to the faces of the outer ring 122. A plurality of screws 136 (typical) extend through and engage the mounting holes 134 via a corresponding plurality of lip holes 138 (typical) in the annular lip 132, thereby attaching the mounting ring 118 to the valve body 24 as shown in FIG. 4.

The open end of the cylindrical cavity 28 generally opposite the inlet port 30 preferably has a removably attached cover 140. When the cover 140 is removed, the diverter member 26 may then be withdrawn from the cylindrical cavity 28.

The cover 140 has a bearing housing 142 through which the other end of the central shafts 40 extends. On this end of the central shaft 40 extending from the first central hub 44 toward the end of the shaft 40, a first clip 144 is received by a first groove 146 in the central shaft 40. A sealing member 148 with an inner and outer seal 150 and 152 is slid onto the central shaft 40 adjacent to the first clip 144. Next, a first bearing 154 is slid onto the central shaft 40 adjacent to the sealing member 148. At this point, this end of the central shaft 40 is inserted through the bearing housing 142 and a second bearing 156. The central shaft 40 is then axially positioned such that a second groove 158 extends beyond the second bearing 156 so as to receive a second clip 160. With the central shaft 40 so positioned, the support ring 38 is spaced from the mounting ring 118 and the bearings 154 and 156 are firmly in place, as shown in FIG. 4. The cover 140 is then removably attached to the valve body 24 with a plurality of cover bolts 162 (typical) which are inserted through a corresponding plurality of cover holes 164 (typical) to engage a corresponding plurality of valve body holes 166 (typical). The diverter member 26 is now rotatably mounted within the cylindrical cavity 28.

As shown in FIGS. 2 and 3, a motor 168 is mounted to the bearing housing 142 via a motor mount 170, which is secured thereon with a plurality of bolts 214 (typical). Through the end of the central shaft 40 extending beyond the second clip 158, a third pin 172 is inserted through a third radial hole 174. The motor 168 engages the central shaft 40 via a drive coupler 176 which engages the third pin 174 and a fourth pin 178 in the motor shaft 180, as shown in FIG. 4. The motor shaft 180 is attached to a gear 204 which engages the screw drive 206 of the motor 168 as shown in FIG. 4. A motor cover 182 is attached to the valve cover 140 utilizing the cover bolts 162.

The diverter plate 42 may now be selectively aligned with one of the outlet ports 32 or 32 upon rotation of the diverter member 26 so as to severely restrict the flow of irrigation water through the aligned or covered outlet port, and to direct flow to the remaining outlet port. Since irrigation water typically contains entrained particulate matter, such as sand, that settles out in the valve body 24 within the cylindrical cavity 28, the travel of the diverter plate 42 is preferably limited by oscillations in the upper valve body so as not to pass through the "bottom" of the valve 10; i.e., the portion of the cylindrical cavity 28 in which the particulate matter has a tendency to settle.

Figure 7:
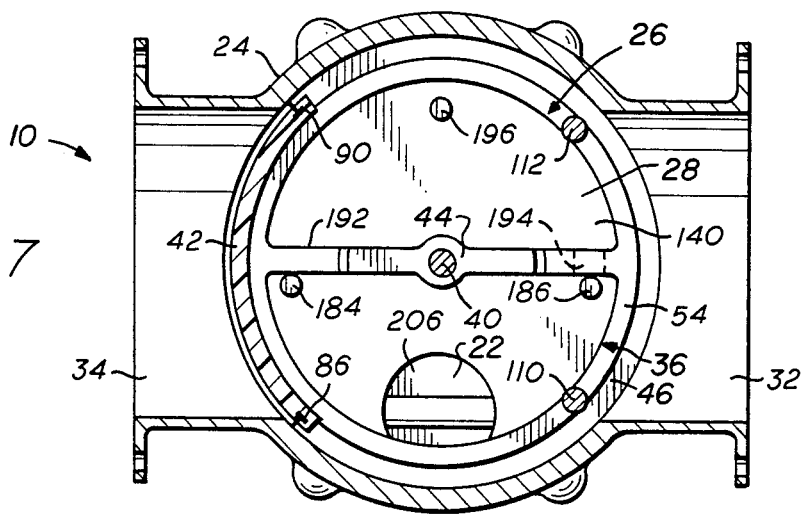
FIG. 7 is a cross-sectional view taken essentially on line 7—7 of FIG. 2 showing the diverter plate in a first position.
Figure 8:
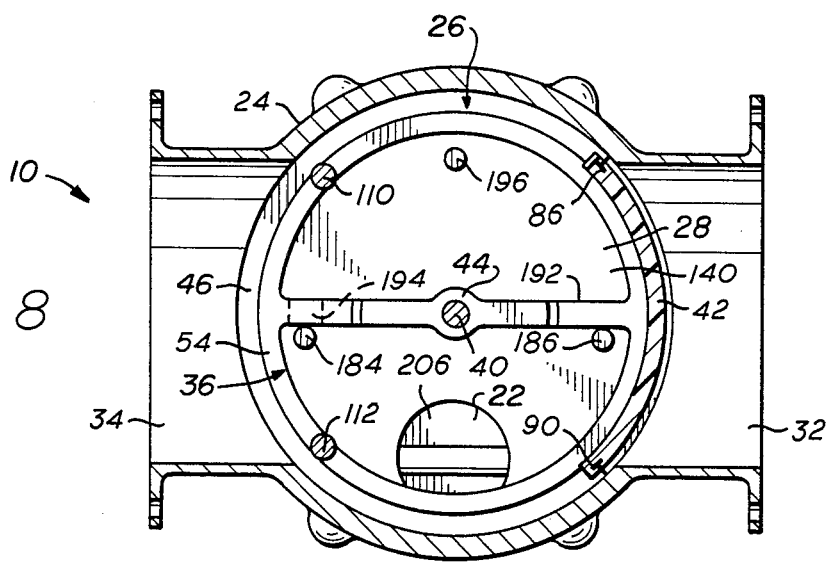
FIG. 8 is like FIG. 7, except showing the deverter plate in a second position.
Figure 9:
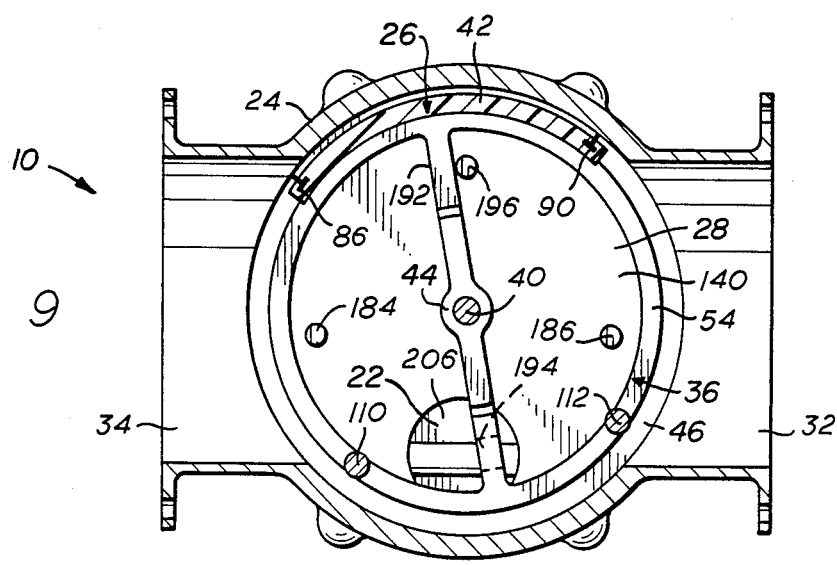
FIG. 9 is like FIG. 7, except showing the diverter plate in a third position.

A first and a second stop pin 184 and 186 are inserted through stop pin holes 188 and 190 in the valve cover 140 to limit the rotation of the diverter member 26 to approximately 180 degrees. On spoke 50 is a stop 192 which respectively engages the stop pins 184 and 186 upon an oscillating 180 degree rotation of the diverter member 26. A slot 194 is cut into spoke 48 to avoid contact with the stop pins 184 and 186 upon rotation. FIG. 7 illustrates the stop 192 engaging the first stop pin 184. In this position, the diverter plate 40 is aligned to cover the second outlet port 34 and divert flow to and through the first outlet port 32. FIG. 8 illustrates the stop 192 engaging the second stop pin 186. In this position, the diverter plate 40 is aligned with the first outlet port 32 to cover this port and it diverts flow to and through the second outlet port 34. FIGS. 4 and 9 illustrate the stop 192 engaging a manual stop pin 196. In this position, the diverter plate 40 is positioned between the first and second outlet let ports 32 and 34, leaving both uncovered in a continuous irrigation mode.

The manual stop pin 196 in this preferred embodiment threadedly engages a hole 198 in the valve cover 140. The manual stop pin 196 has a groove 200 which receives an annular seal 202, such as an O-ring, to sealingly engage the hole 198.

In the preferred embodiment of the present invention, a timer/controller, preferably a programmable controller 216, controls the actuating of the surge irrigation valve 10. The programmable controller 216 acts in programmed sequential steps to energize the motor 168 so as to rotate the diverter member 26. When the stop 192 contacts one of the stop pins 182, 184 or 196, the programmable controller 216 senses the increased power requirement of the motor 168 and de-energizes the motor 168. The diverter plate is then locked in a position engaging one of the stop pins and in alignment with one of the outlet ports. In addition, the programmable controller 216 reverses the polarity of the motor 168 in preparation for the next energizing sequences after a programmed time interval. After the programmed time interval, the motor 168 is energized to unlock or disengage the diverter plate from its position adjacent one stop pin and rotating it to another stop pin.

As noted earlier, the surge irrigation valve 10 has a blow valve 22 which when actuated may be used to water the furrow 20 within which the valve 10 is positioned and/or for blowing out any particulate matter that may have settled out within the valve 10. The blow valve 22 has a butterfly valve 206 attached to a hand-operated lever 208 via a screw 210, as shown in FIGS. 1 through 4.

Figure 10:
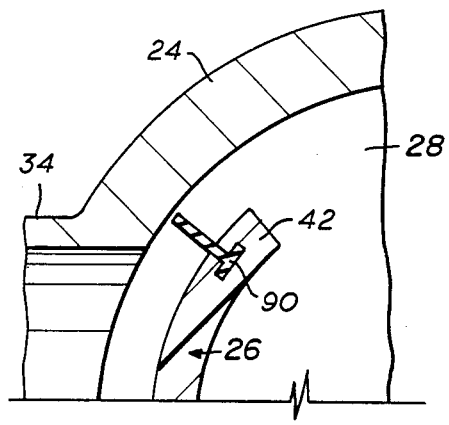
FIG. 10 is an enlarged cross-sectional view of the upper wiper blade shown in FIG. 7.
Figure 11:
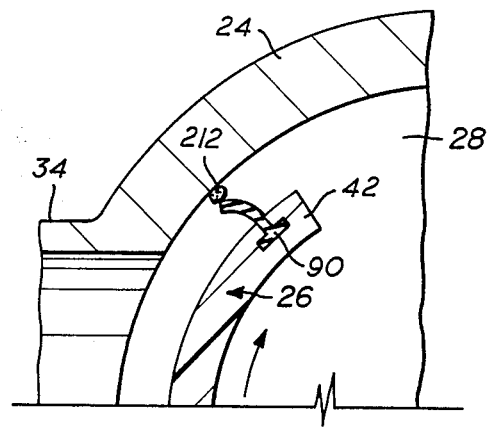
FIG. 11 is like FIG. 10, except showing the wiper blade in a transitory position.

FIG. 10 and 11 illustrate the preferred spatial relationship of the wiper blades (90 is typical) and the interior surface of the valve body 24. However, if so desired, the wiper blades may also be in contact with same. Due to the flexibility of the wiper blades, particulate matter 212 does not easily obstruct the rotation of the diverter member 26. Instead, the wiper blades bend or flex to allow same to go over these particles 212. Additionally, the wiper blades tend to wipe the traveled interior surface of the valve body 24 tending to keep it free of encrusted mineral deposits and particulate matter.

As Table I illustrates, the rated capacity of the surge valve of the present invention is at least about 25% greater than the rated capacity of a commercially available butterfly (flapper) valve used in surge irrigation applications. This is clearly indicative of reduced pressure drops (head loss) experienced across the valves of the present invention.

TABLE I

| | Maximum Flow, gpm Valve Size, inches | | | | |
|---|---|---|---|---|---|
| | 6 | 7 | 7 | 8 | 10 |
| Valve type | | | | | |
| Butterfly | 700 | — | 1200[2] | 1200 | 2000 |
| Surge Valve | 1000 | 1000[1] | 1500[2] | 1500 | 2500[3] |
| Head Loss (ft. of H$_2$O) | | | | | |
| Surge Valve | 1.51 | 1.51 | 1.1 | 1.1 | 0.9 |

[1] 6 inch valve body, 7 inch inlet and outlets.
[2] 8 inch valve body, 7 inch inlet and outlets.
[3] Pump was limiting factor, not the valve; i.e., this is maximum throughput of largest pump the inventor had access to.
[4] Approximately 2.3 feet of H$_2$O equals 1 pound/sq. in.

At these flow rates, the wiper blades allow a restricted flow into the covered outlet port of about 7 gallons per minute (gpm) at 8 p.s.i.g. flowing pressure. For surge irrigation purposes, this leakage is insignificant. The motor 168 at these rates has a maximum power requirement of less than 2.0 amps drawn from portable twelve volt batteries stored in the program controller 216 (as opposed to 12 volt automobile storage batteries).

It will become apparent from the foregoing that many other variations and modifications may be made in the apparatus and methods hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A valve for use in distributing irrigation water in a surge irrigation system, comprising:
   (a) a valve body having a cylindrical cavity, an inlet port and a plurality of outlet ports, said cylindrical cavity and said inlet port being substantially in coaxial alignment; and
   (b) a diverter member rotatably and coaxially mounted within said cylindrical cavity, said diverter member comprising:
      (1) a pair of circular support rings, each of said support rings having a central hub, an outer ring, and a first and second spoke radiating from said central hub to said outer ring,
      (2) an axially aligned central shaft extending through said diverter member centrally and spatially supporting said circular support rings, and
      (3) an arcuate diverter plate conforming to the curvature of said cylindrical cavity mounted to the periphery of said support rings on said outer rings in a spatial relationship with respect to the cylindrically arcuate interior surface of said valve body, said diverter plate being selectively aligned with one of said outlet ports upon rotation of said diverter member so as to cover and restrict the flow of irrigation water through said aligned outlet port and so as to divert the flow to the remaining outlet ports.

2. The valve according to claim 1, further comprising means for rotating said diverter member.

3. The valve according to claim 2, wherein said rotating means comprises means for oscillating said diverter member to avoid any particulate matter previously entrained in the irrigation water which has settled in the lower portion of said cylindrical cavity.

4. The valve according to claim 1, further comprising:
   flexible wiping means mounted to said diverter plate for wiping the cylindrically arcuate interior surface of said valve body as said diverter member is rotated in a circular or oscillatory manner to minimize encrustation of particulate matter entrained in the irrigation water onto same, said flexible means restricting the flow of irrigation water past said diverter plate through an outlet port when the diverter plate is aligned therewith.

5. The valve according to claim 4, wherein said flexible wiping means comprising:
   a first pair of elastomeric wiper blades, each of said first pair of wiper blades mounted adjacent to one of the arcuate edges of said diverter plate; and
   a second pair of elastomeric wiper blades, each of said second pair of wiper blades mounted adjacent to one of the straight edges of said diverter plate and intersecting said first pair of wiper blades at opposite ends thereof.

6. The valve according to claim 1, further comprising:
   a diverter member opening in said valve body in alignment with said diverter member, said diverter member opening positioned generally opposite said inlet port; and
   a removable cover positioned over said diverter member opening and removably attached to said valve body to allow withdrawal of said diverter member from said valve body when said cover is detached therefrom.

7. The valve according to claim 6, further comprising:
   means for watering the furrow in which said valve rests.

8. The valve according to claim 7, further comprising:
   means for flushing out particulate matter that has settled out of the irrigation water within said cylindrical cavity.

9. The valve according to claim 1, further comprising:
   first means for locking and unlocking said diverter member into predetermined aligned positions with respect to said outlet ports.

10. The valve according to claim 9, further comprising:
    second means for locking said diverter member into such a position that none of said outlet ports are blocked.

11. The valve according to claim 9, further comprising:
    programmable means for timing the locking and unlocking of said first locking means.

12. A valve for use in distributing irrigation water in a surge irrigation system, comprising:
    (a) a valve body having a cylindrical cavity, an inlet port and a plurality of outlet ports, said cylindrical cavity and said inlet port being substantially in coaxial alignment;
    (b) a diverter member rotatably and coaxially mounted within said cylindrical cavity, said diverter member comprising:
       (1) a pair of circular support rings, each of said support rings having a central hub, an outer ring, and a first and second spoke radiating from said central hub to said outer ring.
       (2) an axially aligned central shaft extending through said diverter member centrally and spatially supporting said circular support rings, and
       (3) an arcuate diverter plate conforming to the curvature of said cylindrical cavity mounted to the periphery of said support rings on said outer rings in a spatial relationship with respect to the cylindrically arcuate interior surface of said valve body, said diverter plate being selectively aligned with one of said outlet ports upon rotation of said diverter member so as to cover and restrict the flow of irrigation water through said aligned outlet port and so as to divert the flow to the remaining outlet ports;

(c) means for rotating said diverter member in an oscillatory manner so as to avoid any particulate matter previously entrained in the irrigation water which has settled in said cylindrical cavity;

(d) flexible wiping means mounted to said diverter plate for wiping the cylindrically arcuate interior surface of said valve body as said diverter member is rotated to minimize encrustation of particulate matter entrained in the irrigation water onto same, said flexible means further restricting the flow of irrigation water through said aligned outlet port, and said flexible wiping means comprising:

a first pair of elastomeric wiper blades, each of said first pair of wiper blades mounted adjacent to one of the arcuate edges of said diverter plate, and a second pair of elastomeric wiper blades, each of said second pair of wiper blades mounted adjacent to one of the straight edges of said diverter plate and intersecting said first pair of wiper blades at opposite ends thereof; and (e) first means for locking and unlocking said diverter member into predetermined positions with respect to said outlet ports.

13. The valve according to claim 12, further comprising:

second means for locking said diverter member into such a position that none of said outlet ports are blocked.

14. The valve according to claim 13, further comprising:

programmable means for timing the locking and unlocking of said first locking means.

15. The valve according to claim 14, further comprising:

a diverter member opening in said valve body in alignment with said diverter member, said diverter member opening positioned generally opposite said inlet port; and a removable cover positioned over said diverter member opening and removably attached to said valve body to allow withdrawal of said diverter member from said valve body when said cover is detached therefrom.

16. The valve according to claim 15, further comprising:

means for watering the furrow in which said valve rests.

17. The valve according to claim 16, further comprising:

means for flushing out particulate matter that has settled out of the irrigation water within said cylindrical cavity.

* * * * *